(12) United States Patent
Kitano et al.

(10) Patent No.: US 10,704,942 B2
(45) Date of Patent: Jul. 7, 2020

(54) FLOW RATE MEASUREMENT DEVICE

(71) Applicant: Panasonic Intellectual Property Management Co., Ltd., Osaka (JP)

(72) Inventors: Yusuke Kitano, Osaka (JP); Mitsuo Yokohata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 16/065,136

(22) PCT Filed: Nov. 15, 2016

(86) PCT No.: PCT/JP2016/004879
§ 371 (c)(1),
(2) Date: Jun. 22, 2018

(87) PCT Pub. No.: WO2017/122238
PCT Pub. Date: Jul. 20, 2017

(65) Prior Publication Data
US 2019/0003866 A1    Jan. 3, 2019

(30) Foreign Application Priority Data

Jan. 14, 2016  (JP) ................. 2016-004943

(51) Int. Cl.
*G01F 1/74*    (2006.01)
*F23N 5/18*    (2006.01)
(Continued)

(52) U.S. Cl.
CPC .............. *G01F 1/74* (2013.01); *F23N 5/18* (2013.01); *G01F 1/66* (2013.01); *G01F 3/22* (2013.01);
(Continued)

(58) Field of Classification Search
CPC .... F23N 2005/185; F23N 5/18; G01F 15/007; G01F 15/06; G01F 1/66; G01F 1/74; G01F 3/22; G06Q 50/06
(Continued)

(56) References Cited

U.S. PATENT DOCUMENTS 9,026,381 B2*  5/2015  Yokohata ............... G01F 15/00
                                                        702/100
9,026,382 B2*  5/2015  Yokohata ............... G01F 15/00
                                                        702/100
2012/0221259 A1  8/2012  Yokohata

FOREIGN PATENT DOCUMENTS

JP    2011-095200    5/2011
JP    5182153 B      4/2013

OTHER PUBLICATIONS

International Search Report of PCT application No. PCT/JP2016/004879 dated Jan. 24, 2017.

* cited by examiner

*Primary Examiner* — John H Le
(74) *Attorney, Agent, or Firm* — Wenderoth, Lind & Ponack, L.L.P.

(57)  ABSTRACT

Flow rate measurement device includes flow rate measurement unit that measures a flow rate of gas at a prescribed time interval, and arithmetic unit that calculates a characteristic flow rate from the flow rates measured within a predetermined period, and calculates a ratio of each flow rate measured at multiple times within the predetermined period with respect to the characteristic flow rate. In addition, flow rate measurement device includes appliance characteristic extraction unit that extracts an appliance characteristic quantity which indicates a characteristic of a flow rate change in currently using gas appliances within the predetermined period, the appliance characteristic quantity being the ratio (Continued)

or information obtained from the ratio, and appliance inherent characteristic information holding unit that holds an appliance inherent characteristic quantity indicating a characteristic flow rate state of a specific gas appliance. Furthermore, flow rate measurement device includes appliance discrimination unit that discriminates the currently using gas appliance by comparing the appliance characteristic quantity with the appliance inherent characteristic quantity.

4 Claims, 6 Drawing Sheets

(51) Int. Cl.
| | | |
|---|---|---|
| *G01F 1/66* | (2006.01) | |
| *G01F 3/22* | (2006.01) | |
| *G01F 15/06* | (2006.01) | |
| *G06Q 50/06* | (2012.01) | |
| *G01F 15/00* | (2006.01) | |

(52) U.S. Cl.
CPC .............. *G01F 15/06* (2013.01); *G06Q 50/06* (2013.01); *F23N 2005/185* (2013.01); *G01F 15/007* (2013.01)

(58) Field of Classification Search
USPC ............................................ 702/45, 50, 100
See application file for complete search history.

FLOW RATE MEASUREMENT DEVICE

This application is a U.S. national stage application of the PCT International Application No. PCT/JP2016/004879 filed on Nov. 15, 2016, which claims the benefit of foreign priority of Japanese patent application No. 2016-004943 filed on Jan. 14, 2016, the contents all of which are incorporated herein by reference.

TECHNICAL FIELD

The present invention relates to a technique for detecting a change in a flow rate of gas so as to discriminate a gas appliance which starts to be used.

BACKGROUND ART

A gas meter device has been proposed which identifies which gas appliance starts to be used based on a flow rate change in gas flowing in a pipe. For example, PTL 1 below discloses a gas meter device in which a gas flow rate is measured at a prescribed time interval and a change pattern of an obtained flow rate value is compared with a change pattern of a flow rate value previously obtained for each gas appliance so as to discriminate the gas appliance which starts to be used. More specifically, the gas meter device disclosed in PTL 1 below converts a change amount of the gas flow rate obtained at each prescribed time interval into a corresponding code, and compares an obtained code string with a characteristic code string previously obtained for each gas appliance, thereby discriminating the gas appliance. PTL 1 has proposed to improve accuracy in discriminating the gas appliance as follows. In order to discriminate the gas appliance, in addition to the comparison of the code string, the flow rate indicating a characteristic of the gas appliance is further used, such as the flow rate during a slow ignition operation in a gas fan heater, for example. For reference, all disclosure contents of PTL 1 are incorporated herein by reference.

CITATION LIST

Patent Literature

PTL 1: Japanese Patent Unexamined Publication No. 2011-095200

SUMMARY OF THE INVENTION

However, a method in the related art has the following problem. In order to meet a consumer demand, a gas appliance is newly developed and sold in which a high gas flow rate unexpected so far is required when an operation starts. In a case where this gas appliance is used by being connected to a gas meter device, the gas meter device cannot identify the gas appliance. For example, in the future, there is a little possibility that a larger-size gas appliance requiring much more gas when the operation starts may be introduced into the market. If this new gas appliance is connected to a downstream side of the gas meter device and starts to be used, a measurement value of the gas flow rate exceeds an expected value. Accordingly, the gas meter device cannot correctly discriminate the gas appliance. That is, the gas meter device cannot identify which gas appliance starts to be used.

Even in a case where the gas meter device is connected to the new gas appliance in which the high gas flow rate unexpected so far is required when the operation starts, if the gas meter device can discriminate the gas appliance, it is not necessary to replace the gas meter device every time the new gas appliance is sold. Therefore, discriminating the gas appliance is useful.

The present invention aims to provide a flow rate measurement device capable of discriminating a gas appliance, even in a case where the flow rate measurement device is connected to a new gas appliance in which a high gas flow rate unexpected so far is required when an operation starts.

An exemplary flow rate measurement device according to the present specification includes a flow rate measurement unit that measures a flow rate of gas flowing through a flow path at a prescribed time interval, and an arithmetic unit that calculates a characteristic flow rate from the flow rates measured within a predetermined period by the flow rate measurement unit, and calculates a ratio of each flow rate measured at multiple times within the predetermined period by the flow rate measurement unit with respect to the characteristic flow rate. In addition, the flow rate measurement device includes an appliance characteristic extraction unit that extracts an appliance characteristic quantity which indicates a characteristic of a flow rate change in a currently using gas appliance within the predetermined period, the appliance characteristic quantity being the ratio or information obtained from the ratio, and an appliance inherent characteristic information holding unit that holds one or more appliance inherent characteristic quantities indicating a characteristic flow rate state of a specific gas appliance. Furthermore, the flow rate measurement device includes an appliance discrimination unit that discriminates the currently using gas appliance by comparing the appliance characteristic quantity extracted by the appliance characteristic extraction unit with the appliance inherent characteristic quantity corresponding to the appliance characteristic quantity out of the one or more appliance inherent characteristic quantities held by the appliance inherent characteristic information holding unit.

According to this configuration, the flow rate measurement device can discriminate the gas appliance, even in a case where the flow rate measurement device is connected to the new gas appliance in which a high gas flow rate unexpected so far is required when an operation starts.

DESCRIPTION OF EMBODIMENT

Figure 1:
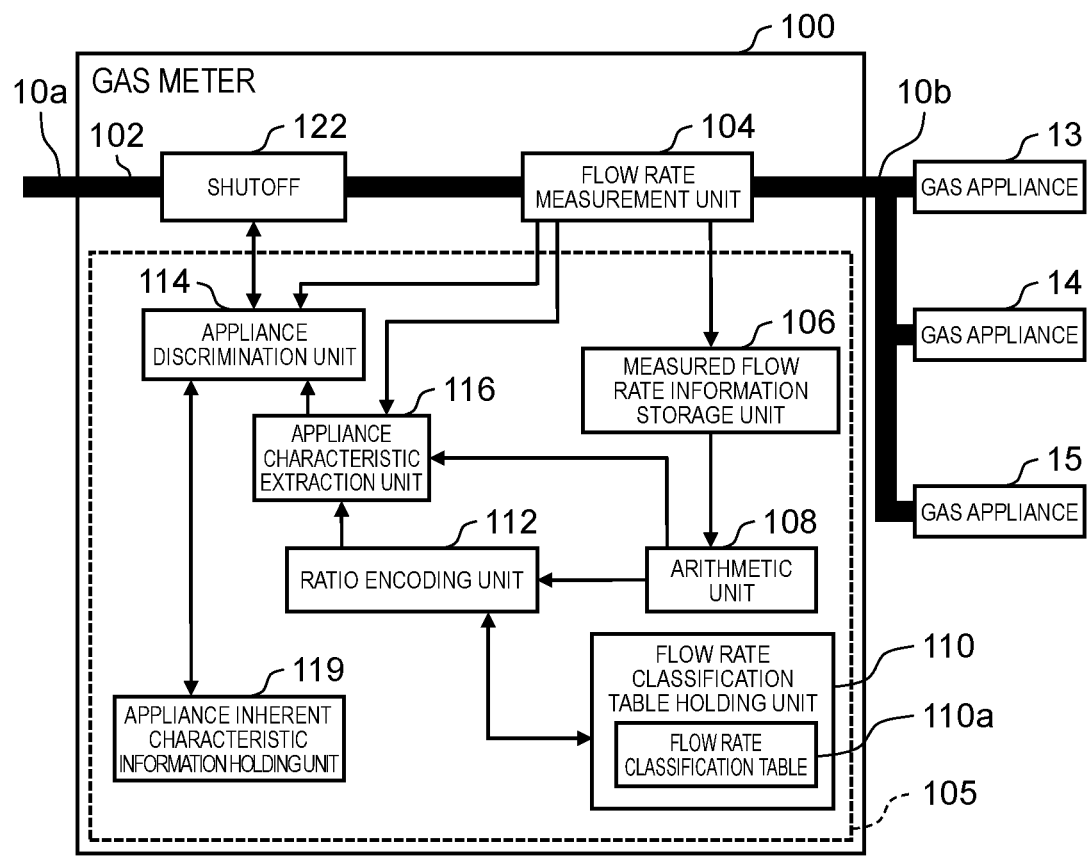
FIG. 1 is a block diagram illustrating an exemplary configuration of a gas meter according to an exemplary embodiment of the present invention.

Hereinafter, an exemplary embodiment of a flow rate measurement device according to the present invention will be described with reference to the accompanying drawings. In the exemplary embodiment described below, a gas meter will be described as an example of the flow rate measurement device, and processing thereof will be described. In the drawings, the same reference numerals will be given to the same configuration elements, and repeated description of the previously described configuration elements will be omitted. The present invention is not limited to the exemplary embodiment described below.

(Exemplary Configuration of Flow Rate Measurement Device)

FIG. 1 illustrates a configuration example of gas meter 100 according to the exemplary embodiment of the present invention. Gas meter 100 internally has flow path 102, and is used in a state of being connected to gas pipe 10a for supplying gas. Gas meter 100 is located between gas pipe 10a and a plurality of gas appliances (a gas stove, a gas fan heater, and a water heater). FIG. 1 illustrates a state where one end of flow path 102 of gas meter 100 is connected to gas pipe 10a on an upstream side and the other end of flow path 102 is connected to gas pipe 10b on a downstream side. Here, gas appliances 13, 14, and 15 are connected to gas pipe 10b.

In a configuration illustrated in FIG. 1, gas meter 100 schematically has flow rate measurement unit 104 located in an intermediate portion of the flow path, and control unit 105. Flow rate measurement unit 104 measures a flow rate of gas flowing through flow path 102 at a prescribed time interval (hereinafter, referred to as a "sampling interval" in some cases). For example, the sampling interval is 0.5 seconds. For example, as flow rate measurement unit 104, an ultrasonic flowmeter can be applied. The ultrasonic flowmeter measures an instantaneous flow rate of the gas by emitting ultrasonic waves to the gas flowing in flow path 102 at a prescribed time interval and by calculating a propagation time difference caused by a gas flow. Fluctuations in a usage amount of the gas can be detected by acquiring data indicating the flow rate at a prescribed time interval which is detected by flow rate measurement unit 104.

In the configuration illustrated in FIG. 1, control unit 105 has measured flow rate information storage unit 106, arithmetic unit 108, appliance characteristic extraction unit 116, appliance inherent characteristic information holding unit 119, and appliance discrimination unit 114. In the illustrated example, control unit 105 further has flow rate classification table holding unit 110 and ratio encoding unit 112. A typical example of an operation of gas meter 100 will be described later.

In this example, gas meter 100 has shutoff unit 122 located between gas pipe 10a and flow rate measurement unit 104. When an abnormal increase in the flow rate of the gas is detected, based on control of control unit 105, shutoff unit 122 stops gas supply to gas appliances 13, 14, and 15 connected to gas pipe 10b. For example, as shutoff unit 122, a shutoff valve can be used.

Arithmetic unit 108 calculates a flow rate indicating a characteristic of the gas appliance (hereinafter, referred to as a "characteristic flow rate") from the flow rates measured by flow rate measurement unit 104. An example of the characteristic flow rate will be described later. In order to calculate the characteristic flow rate, one or more flow rate values measured in a certain length of time (hereinafter, referred to as a "predetermined period") are used. Typically, the predetermined period means a period of approximately 8 seconds after any one of one or more gas appliances (here, gas appliances 13 to 15) connected to gas pipe 10b starts to be used. As a matter of course, a length of the predetermined period is not limited to 8 seconds, and any desired length of time may be adopted. The predetermined period may be a period required for discriminating the gas appliance which starts to be used.

In the exemplary embodiment according to the present invention, furthermore, arithmetic unit 108 calculates a ratio of the flow rate acquired by flow rate measurement unit 104 with respect to the characteristic flow rate. This ratio is calculated for each of a plurality of measurement values obtained in the predetermined period. Therefore, for example, in a case where the predetermined period and the sampling interval are respectively 8 seconds and 0.5 seconds and a start time of the prescribed period coincides with a first measurement timing, a sequence configured to include a string of 17 ratios is obtained corresponding to 17 times of the measurement timing. Measured flow rate information storage unit 106 is used as a temporary memory in calculating the characteristic flow rate and the ratio. Measured flow rate information storage unit 106 may be located inside control unit 105 or outside control unit 105.

Based on a calculation result of arithmetic unit 108, appliance characteristic extraction unit 116 extracts the appliance characteristic quantity indicating a characteristic of the flow rate change in the currently using gas appliance within the predetermined period. In other words, the appliance characteristic quantity of the gas appliance which starts to be used in the predetermined period is extracted. The appliance characteristic quantity widely includes the above-described ratio or information obtained from the above-described ratio.

Appliance inherent characteristic information holding unit 119 pre-holds one or more appliance inherent characteristic quantities indicating a characteristic flow rate state for each gas appliances. An example of the appliance inherent characteristic quantity is the characteristic flow rate, the above-described ratio, or a code string generated using the ratio. An example of the code string will be described later.

For example, in a case where the start of the gas fan heater needs to be detected, one or more appliance inherent characteristic quantities corresponding to the gas fan heater are pre-stored in appliance inherent characteristic information holding unit 119. In an aspect, as the appliance inherent characteristic quantity of the gas fan heater, appliance inherent characteristic information holding unit 119 pre-holds an average of the flow rate values obtained during a period of slow ignition, in addition to the above-described characteristic flow rate, the ratio, or the code string generated using the ratio. In a case of discriminating the plurality of gas appliances such as the gas fan heater, the gas stove, and the water heater, the appliance inherent characteristic quantities respectively corresponding to the gas fan heater, the gas stove, and the water heater can be pre-stored in appliance inherent characteristic information holding unit 119.

Appliance discrimination unit 114 compares the appliance characteristic quantity extracted by appliance characteristic extraction unit 116 with the appliance inherent characteristic quantity held by appliance inherent characteristic information holding unit 119 so as to determine the currently using gas appliance. For example, in a case of using the above-described ratio as the appliance characteristic quantity, appliance discrimination unit 114 acquires a sequence of a plurality of the ratios corresponding to a plurality of measurement timings from appliance characteristic extraction unit 116, and compares the sequence with a sequence of the ratios serving as the appliance inherent characteristic quantities which are pre-stored in appliance inherent characteristic information holding unit 119. In a case of discriminating the gas fan heater, the gas stove, and the water heater, the sequence acquired from appliance characteristic extraction unit 116 and each characteristic sequence of each appliance are compared with each other. For example, in a case where the sequence acquired from appliance characteristic extraction unit 116 coincides with the characteristic sequence of the gas fan heater, or there is the highest degree of similarity between these sequences, appliance discrimination unit 114 determines that the gas appliance which starts to be used is the gas fan heater.

(Findings of Present Inventors)

Figure 2:
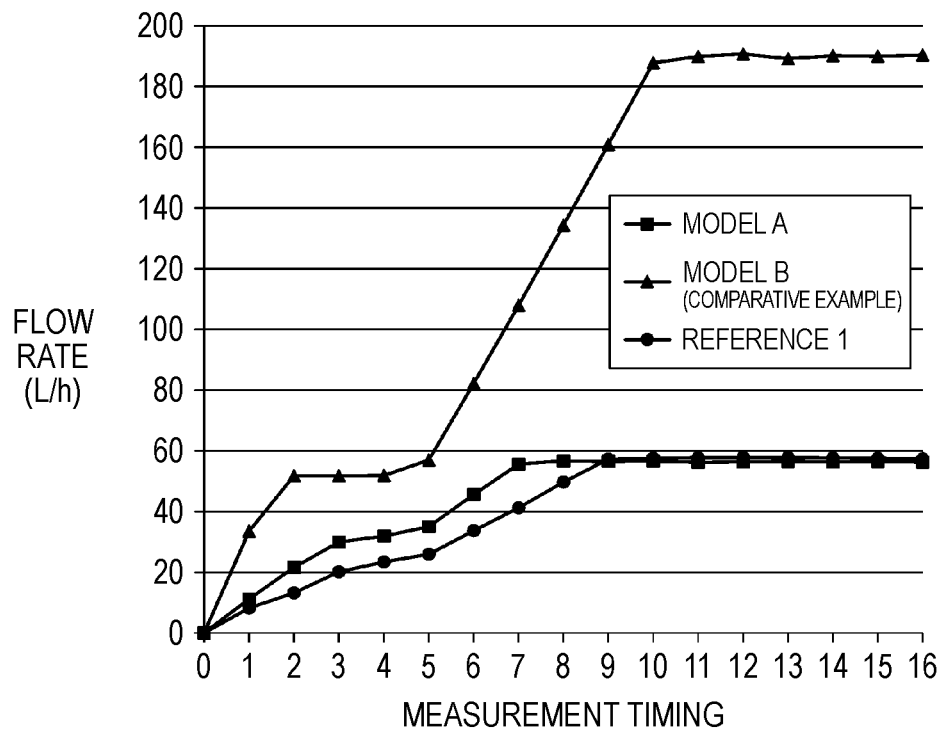
FIG. 2 is a graph illustrating an example of a pattern of a flow rate change in a predetermined period, for a certain gas appliance.

Here, findings of the present inventors will be described. FIG. 2 illustrates an example of a pattern of a flow rate change for a certain gas appliance in a predetermined period (in this example, 8 seconds from when each gas appliance starts to be used). In FIG. 2, each pattern of two flow rate changes obtained by changing a model and a pattern (Reference 1) of a flow rate change as the appliance inherent characteristic quantity are illustrated in a single drawing. In the example described here, the sampling interval is set to 0.5 seconds. In the following description, the sampling interval is also set to 0.5 seconds unless otherwise specified.

As can be understood from FIG. 2, the pattern of the flow rate change in Reference 1 is illustrated as follows. The flow rate change increases at an initial stage in the predetermined period. At a subsequent stage (after measurement timing "9"), the flow rate change in each sampling interval decreases, and the flow rate is substantially constant. In this example, a pattern in which an increasing rate of the flow rate becomes smaller compared to the initial stage in the predetermined period appears in the vicinity of measurement timings "3" to "5".

A graph of model A will be described. It is understood from FIG. 2 that model A has a pattern of the flow rate change similar to Reference 1. More specifically, similar to Reference 1, the change in the flow rate in model A shows a pattern in which the flow rate increases at the initial stage in the predetermined period, and thereafter, the flow rate is stabilized. In addition, this example shows a portion where the increasing rate of the flow rate is relatively small until the flow rate becomes substantially constant. Therefore, these patterns can lead to a conclusion that model A is the gas appliance which is the same type as that of Reference 1 (for example, the gas fan heater).

On the other hand, although model B illustrated as a comparative example is the gas appliance which is the same type as that of Reference 1, model B shows the flow rate value which is extremely greater than that of Reference 1, especially in the subsequent stage in the predetermined period. The pattern of the flow rate change in model B illustrated in FIG. 2 corresponds to the pattern of the flow rate change when using a new gas appliance in which a high gas flow rate unexpected so far is required when the operation starts. As can be understood from FIG. 2, the flow rate value at each measurement timing in model B is considerably greater than the corresponding flow rate value in Reference 1. Therefore, if the patterns of the flow rate change are simply compared with each other, it is difficult to determine that model B corresponds to which type of gas appliance.

Figure 3:
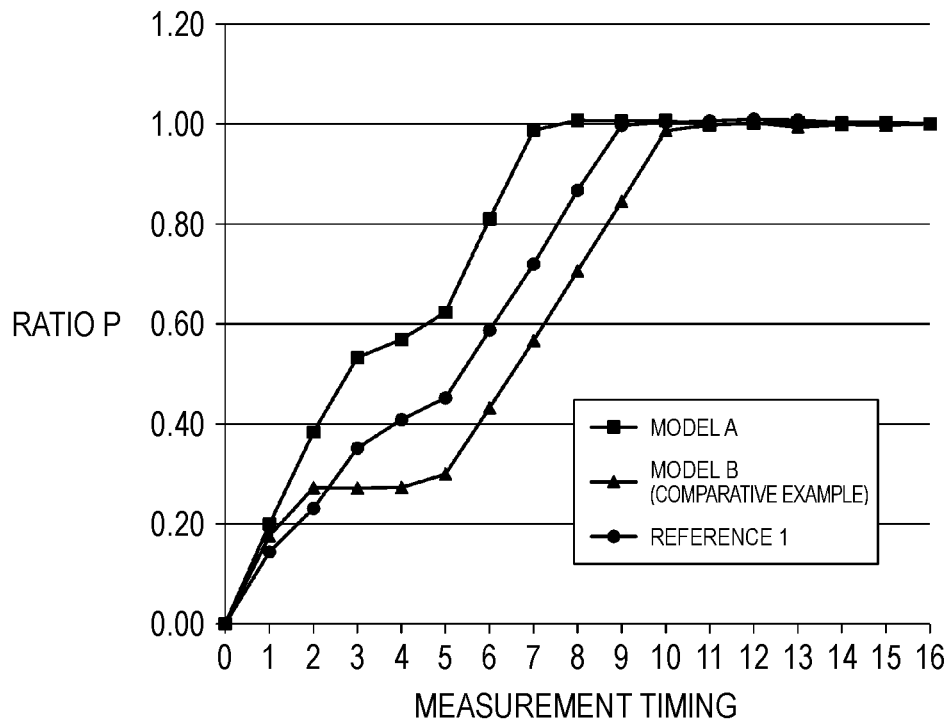
FIG. 3 is a graph illustrating a ratio change in each flow rate value with respect to the characteristic flow rate, which is obtained for each of model A, model B, and Reference 1 illustrated in FIG. 2.

Referring to FIG. 3, description will be continued. FIG. 3 illustrates the pattern of the above-described ratio change obtained for each of model A, model B, and Reference 1 illustrated in FIG. 2. The ratio at each measurement timing is obtained by dividing the flow rate value at each measurement timing by the characteristic flow rate. Here, the flow rate obtained at the last measurement timing within the predetermined period is used as the characteristic flow rate. That is, if Q(k) is set to an absolute flow rate corresponding to the measurement timing of the k-th (here, k=0 to 16), a ratio P in the graph in FIG. 3 is a value obtained from Expression (1) below.

$$P=(Q(k)/Q(16)) \quad (1)$$

As illustrated in FIG. 3, both the ratios in model A and model B show a change pattern similar to a change pattern of the ratio in Reference 1. According to this pattern, it is possible to determine that model B is the gas appliance which is the same type as that of Reference 1. In this way, through the comparison based on the pattern of the ratio change, the gas appliance can be discriminated without depending on the quantity of the overall flow rates in the predetermined period. A criterion for determining whether or not the gas appliance is the same type as that in Reference (here, Reference 1) can be optionally set. For example, when the flow rate value measured at each measurement timing falls within a predetermined range with respect to the flow rate value of Reference, the gas appliance which starts to be used may be determined as the gas appliance which is the same type as that of Reference. Alternatively, when the sum of the square of a difference between the flow rate value measured at each measurement timing and the flow rate value of Reference is smaller than a predetermined value, the gas appliance which starts to be used may be determined as the gas appliance which is the same type as that of Reference. As in this example, as the characteristic flow rate, it is possible to use the flow rate obtained at the latest time (here, Q(16)) out of the flow rates measured within the predetermined period.

For example, as the characteristic flow rate, it is also possible to use the highest flow rate within the predetermined period. Alternatively, if the discrimination is performed on the gas appliance having the pattern of the flow rate change so that the fluctuation of the flow rate becomes smaller in the subsequent stage in the predetermined period, an average (hereinafter, referred to as a "stable flow rate" in some cases) of the flow rate values in a region having the small fluctuation of the flow rate in the subsequent stage in the predetermined period may be used as the characteristic flow rate. In the pattern of the flow rate change, if the gas appliance (for example, the gas fan heater) has a flat portion in the period until the flow rate is stabilized, an average (hereinafter, referred to as an "intermediate stable flow rate" in some cases) of the flow rate values of the flat portion may be used as the characteristic flow rate. In the pattern of the flow rate change, the flat portion appearing in the period until the flow rate is stabilized generally represents the flow rate change corresponding to the slow ignition operation.

Figure 4:
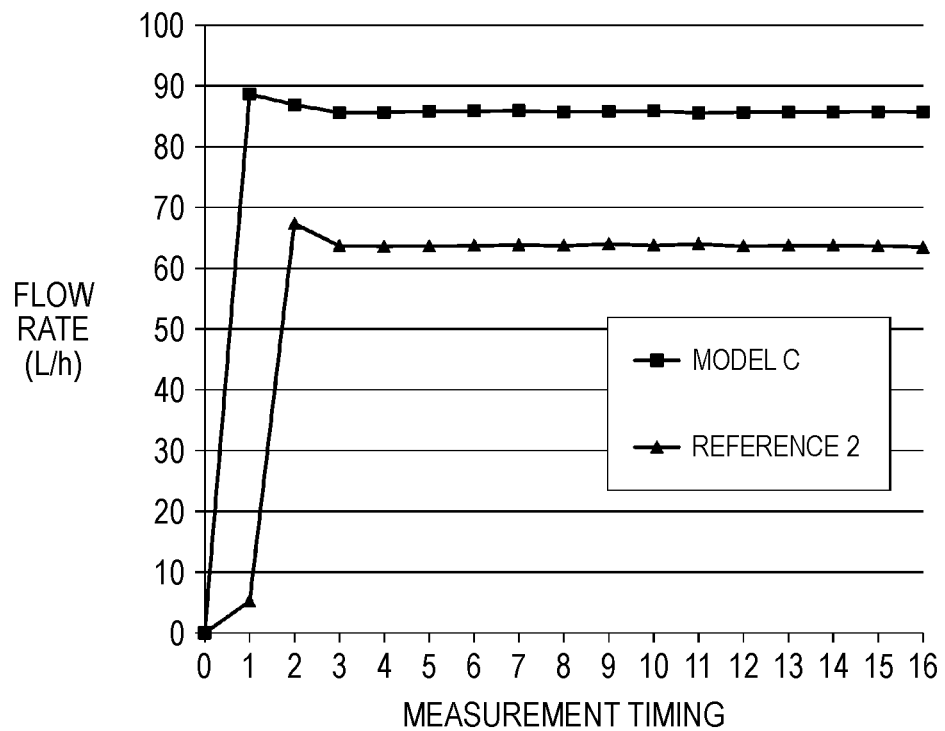
FIG. 4 is a graph illustrating an example of a pattern of a flow rate change in a predetermined period, for another gas appliance different from model A, model B, and Reference 1 shown in FIGS. 2 and 3.
Figure 5:
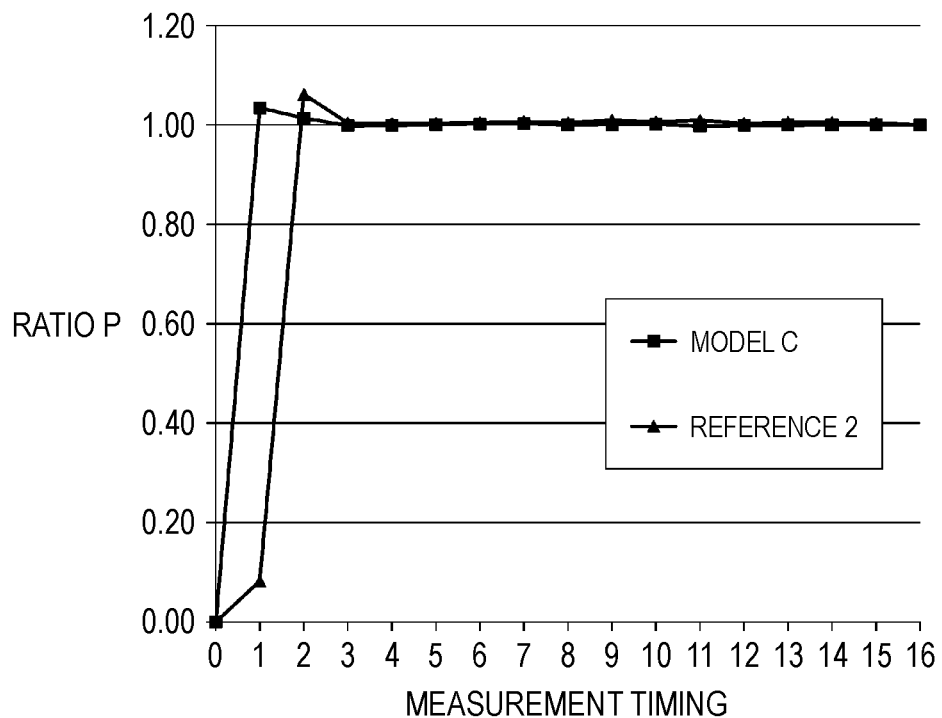
FIG. 5 is a graph illustrating a pattern of a ratio change in each flow rate value with respect to a characteristic flow rate, which is obtained for each of model C and Reference 2 illustrated in FIG. 4.

FIG. 4 illustrates an example of the pattern of the flow rate change in the predetermined period for the other gas appliance different from those in model A, model B, and Reference 1 illustrated in FIGS. 2 and 3. In FIG. 4, the pattern of the flow rate change of model C and the pattern (Reference 2) of the flow rate change as the appliance inherent characteristic quantity are illustrated together in one drawing. FIG. 5 illustrates the pattern of the above-described ratio change obtained for each of model C and Reference 2 illustrated in FIG. 4.

In the example illustrated in FIG. 4, there is a large deviation of the flow rate value of model C from the flow rate value of Reference 2 at each measurement timing. Accordingly, if the patterns of the flow rate changes are simply compared with each other, it is generally difficult to determine whether or not model C is the gas appliance which is the same type as that of Reference 2. In contrast, in the graph of the ratio P illustrated in FIG. 5, it can be understood that a similar pattern is obtained between model C and Reference 2. For the sake of reference, the flow rate values at each measurement timing for each of model A, model B, and Reference 1, and model C and Reference 2 are illustrated in Table 1 below, and the ratios calculated for these flow rate values by using Expression (1) described above are illustrated in Table 2 below.

TABLE 1

| Measurement Timing | Flow Rate (L/h) | | | | |
|---|---|---|---|---|---|
| | Model A | Model B (Comparative Example) | Reference 1 | Model C | Reference 2 |
| 0 | 0 | 0 | 0 | 0 | 0 |
| 1 | 11.2 | 33.509 | 8.247 | 88.666 | 5.23 |
| 2 | 21.586 | 51.82 | 13.233 | 86.883 | 67.338 |
| 3 | 29.979 | 51.768 | 20.158 | 85.584 | 63.682 |
| 4 | 31.999 | 51.899 | 23.457 | 85.612 | 63.582 |
| 5 | 35.073 | 57.009 | 25.93 | 85.811 | 63.658 |
| 6 | 45.594 | 82.149 | 33.698 | 85.879 | 63.734 |
| 7 | 55.579 | 107.883 | 41.271 | 85.935 | 63.834 |
| 8 | 56.678 | 134.332 | 49.739 | 85.711 | 63.734 |
| 9 | 56.63 | 160.823 | 57.229 | 85.811 | 64.01 |
| 10 | 56.678 | 187.803 | 57.553 | 85.863 | 63.787 |
| 11 | 56.203 | 189.911 | 57.712 | 85.532 | 64.01 |
| 12 | 56.33 | 190.729 | 57.929 | 85.631 | 63.634 |
| 13 | 56.426 | 189.138 | 57.829 | 85.663 | 63.761 |
| 14 | 56.378 | 190.105 | 57.577 | 85.715 | 63.761 |
| 15 | 56.451 | 189.929 | 57.516 | 85.739 | 63.662 |
| 16 | 56.278 | 190.298 | 57.368 | 85.715 | 63.438 |

TABLE 2

| Measurement Timing | Ratio | | | | |
|---|---|---|---|---|---|
| | Model A | Model B (Comparative Example) | Reference 1 | Model C | Reference 2 |
| 0 | 0.00 | 0.00 | 0.00 | 0.00 | 0.00 |
| 1 | 0.20 | 0.18 | 0.14 | 1.03 | 0.08 |
| 2 | 0.38 | 0.27 | 0.23 | 1.01 | 1.06 |
| 3 | 0.53 | 0.27 | 0.35 | 1.00 | 1.00 |
| 4 | 0.57 | 0.27 | 0.41 | 1.00 | 1.00 |
| 5 | 0.62 | 0.30 | 0.45 | 1.00 | 1.00 |
| 6 | 0.81 | 0.43 | 0.59 | 1.00 | 1.00 |
| 7 | 0.99 | 0.57 | 0.72 | 1.00 | 1.01 |
| 8 | 1.01 | 0.71 | 0.87 | 1.00 | 1.00 |
| 9 | 1.01 | 0.85 | 1.00 | 1.00 | 1.01 |
| 10 | 1.01 | 0.99 | 1.00 | 1.00 | 1.01 |
| 11 | 1.00 | 1.00 | 1.01 | 1.00 | 1.01 |
| 12 | 1.00 | 1.00 | 1.01 | 1.00 | 1.00 |
| 13 | 1.00 | 0.99 | 1.01 | 1.00 | 1.01 |
| 14 | 1.00 | 1.00 | 1.00 | 1.00 | 1.01 |
| 15 | 1.00 | 1.00 | 1.00 | 1.00 | 1.00 |
| 16 | 1.00 | 1.00 | 1.00 | 1.00 | 1.00 |

As described above, depending on matching of the patterns of the flow rate changes, in a case of using a model not existing in the past, the gas flow rate different from the expected gas flow rate is measured. Accordingly, prepared data may be useless, thereby causing a possibility that the model may not be correctly discriminated. In contrast, as described with reference to FIGS. 2 to 5, if the types of the gas appliances are the same as each other, the change pattern in the ratio calculated based on the characteristic flow rate tends to show roughly the same behavior in the predetermined period.

That is, if the types of the gas appliances are the same as each other, even if the model (for example, a model requiring larger gas consumption) does not exist in the past, it is considered that the patterns of the ratio changes in the predetermined period are substantially the same as each other. Therefore, matching using the ratio in which the measurement value of the flow rate is normalized using the characteristic flow rate is particularly useful in discriminating the gas appliance in a case of using the model not existing in the past. In the exemplary embodiment of the present invention, the above-described ratio or the information obtained from the above-described ratio is extracted as the appliance characteristic quantity. The appliance characteristic quantity and the corresponding appliance inherent characteristic quantity pre-held by appliance inherent characteristic information holding unit 119 are compared with each other. According to the exemplary embodiment of the present invention, even in a case of using the model not existing in the past, the gas appliance can be discriminated.

(Operation Example in Gas Meter 100)

Hereinafter, an operation example in the gas meter 100 will be described with reference to FIGS. 6 to 10.

As previously described with reference to FIG. 1, appliance discrimination unit 114 compares the appliance characteristic quantity extracted by appliance characteristic extraction unit 116 and the appliance inherent characteristic quantity held by appliance inherent characteristic information holding unit 119 with each other, thereby discriminating the currently using gas appliance. For example, in a case of using the pattern of the above-described ratio change in the predetermined period, appliance inherent characteristic information holding unit 119 pre-holds the pattern of the ratio change, for example, for each gas appliance (the gas fan heater, the gas stove, and the water heater) as the appliance inherent characteristic quantity. As will be described in detail below, the appliance inherent characteristic quantity is not limited to the pattern of the above-described ratio change. For example, the gas appliance can be discriminated using a code string (hereinafter, referred to as a "ratio code string" in some cases) obtained by converting a difference between the ratios obtained at each sampling interval into a code corresponding to the size.

Referring back to FIG. 1, description will be continued. The gas meter 100 illustrated in FIG. 1 has ratio encoding unit 112. Ratio encoding unit 112 generates the ratio code string by encoding the ratio calculated from each of the flow rates at a plurality of times which are measured in the predetermined period. Hereinafter, an example of a method of generating the ratio code string will be described.

For example, arithmetic unit 108 receives the flow rate measured by flow rate measurement unit 104. Based on the measurement value of the flow rate, arithmetic unit 108 calculates a difference between the ratio at a certain measurement timing and the ratio at the previous measurement timing. Ratio encoding unit 112 acquires the difference between the ratios from arithmetic unit 108, and converts the difference between the ratios into a code corresponding to an absolute value. For example, ratio encoding unit 112 can convert the difference between the ratios into a code with reference to a table having a recorded code corresponding to a size of the difference between the ratios.

Control unit 105 illustrated in FIG. 1 has flow rate classification table holding unit 110 for holding flow rate classification table 110a. Here, ratio encoding unit 112 converts the difference between the ratios into a corresponding code with reference to flow rate classification table 110a stored in flow rate classification table holding unit 110. Table 3 below illustrates an example of flow rate classification table 110a. As a matter of course, the number of classifications of flow rate classification table 110a is not limited to 11 classifications illustrated in Table 3.

TABLE 3

| Difference X between Ratios | Code |
| --- | --- |
| X ≤ 0.01 | 0 |
| 0.01 < X ≤ 0.10 | 1 |
| 0.10 < X ≤ 0.20 | 2 |
| 0.20 < X ≤ 0.30 | 3 |
| 0.30 < X ≤ 0.40 | 4 |
| 0.40 < X ≤ 0.50 | 5 |
| 0.50 < X ≤ 0.60 | 6 |
| 0.60 < X ≤ 0.70 | 7 |
| 0.70 < X ≤ 0.80 | 8 |
| 0.80 < X ≤ 0.90 | 9 |
| 0.90 < X ≤ 1.00 | 10 |
| 1.00 < X | 10 |

In Table 3, if P(k) is set to the ratio corresponding to the measurement timing of the k-th (here, k=0 to 16), difference X between the ratios is calculated by Expression (2) below. However, in a case of k=0, there is no value of P(−1). Accordingly, X=0 is satisfied.

$$X = P(k) - P(k-1) \quad (2)$$

Through code conversion using flow rate classification table 110a, it is possible to obtain a code string corresponding to a temporal change of ratio P (which may be called a code string corresponding to a temporal change of difference X), that is, the ratio code string. Therefore, appliance characteristic extraction unit 116 can extract the ratio code string generated as the appliance characteristic quantity indicating the characteristic of the flow rate change in the currently using gas appliance within the predetermined period.

In a case of using the ratio code string, the ratio code string to be compared is pre-stored as the appliance inherent characteristic quantity in appliance inherent characteristic information holding unit 119. For example, appliance inherent characteristic information holding unit 119 pre-holds the ratio code string calculated based on the flow rate value of Reference 1 described above.

Table 4 below illustrates differences between the ratios obtained from the flow rate values of model A, model B, and Reference 1 described above, and conversion results of each difference converted into a code. As illustrated in Table 4 below, in a case where model A starts to be used, "02221122100000000" is generated as the ratio code string. In a case where model B starts to be used, "02100122222100000" is generated as the ratio code string.

TABLE 4

| Measurement Timing | Model A Difference between Ratios | Code | Model B (Comparative Example) Difference between Ratios | Code | Reference 1 Difference between Ratios | Code |
| --- | --- | --- | --- | --- | --- | --- |
| 0 | 0.00 | 0 | 0.00 | 0 | 0 | 0 |
| 1 | 0.20 | 2 | 0.18 | 2 | 0.14 | 2 |
| 2 | 0.18 | 2 | 0.10 | 1 | 0.09 | 1 |
| 3 | 0.15 | 2 | 0.00 | 0 | 0.12 | 2 |
| 4 | 0.04 | 1 | 0.00 | 0 | 0.06 | 1 |
| 5 | 0.05 | 1 | 0.03 | 1 | 0.04 | 1 |
| 6 | 0.19 | 2 | 0.13 | 2 | 0.14 | 2 |
| 7 | 0.18 | 2 | 0.14 | 2 | 0.13 | 2 |
| 8 | 0.02 | 1 | 0.14 | 2 | 0.15 | 2 |
| 9 | 0.00 | 0 | 0.14 | 2 | 0.13 | 2 |
| 10 | 0.00 | 0 | 0.14 | 2 | 0.01 | 0 |
| 11 | −0.01 | 0 | 0.01 | 1 | 0.00 | 0 |
| 12 | 0.00 | 0 | 0.00 | 0 | 0.00 | 0 |
| 13 | 0.00 | 0 | −0.01 | 0 | 0.00 | 0 |
| 14 | 0.00 | 0 | 0.01 | 0 | 0.00 | 0 |
| 15 | 0.00 | 0 | 0.00 | 0 | 0.00 | 0 |
| 16 | 0.00 | 0 | 0.00 | 0 | 0.00 | 0 |

Figure 6:
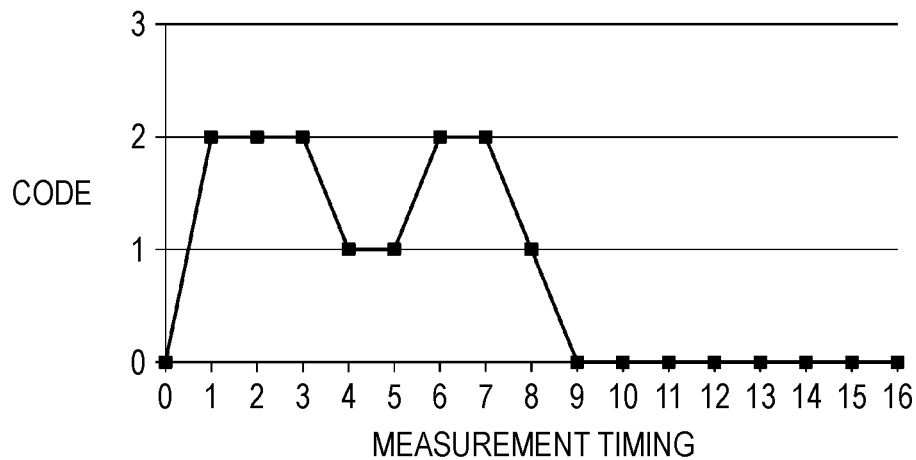
FIG. 6 is a graph illustrating a ratio code string of model A when codes are arrayed on a vertical axis.
Figure 7:
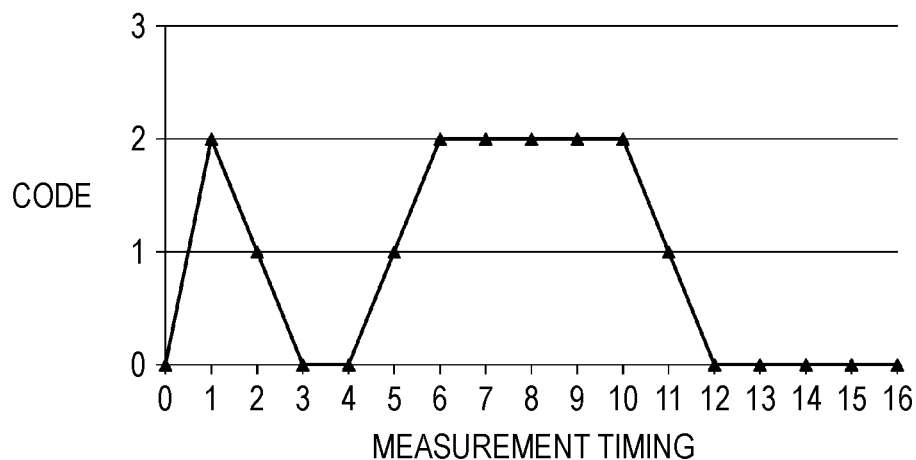
FIG. 7 is a graph illustrating a ratio code string of model B when codes are arrayed on the vertical axis.
Figure 8:
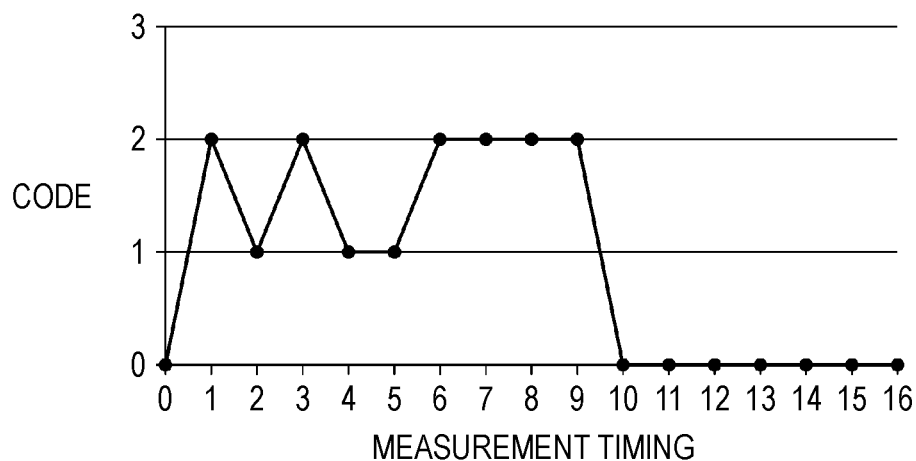
FIG. 8 is a graph illustrating a ratio code string of Reference 1 when codes are arrayed on the vertical axis.
Figure 9:
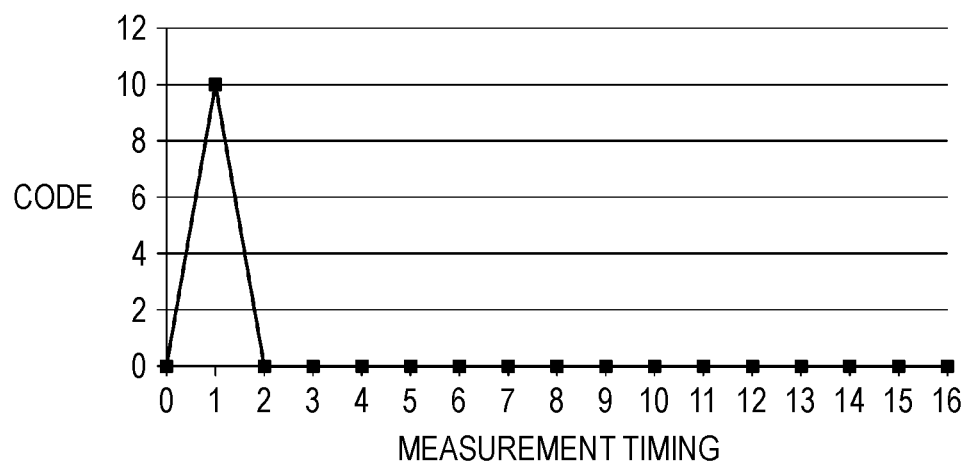
FIG. 9 is a graph illustrating a ratio code string of model C when codes are arrayed on the vertical axis.
Figure 10:
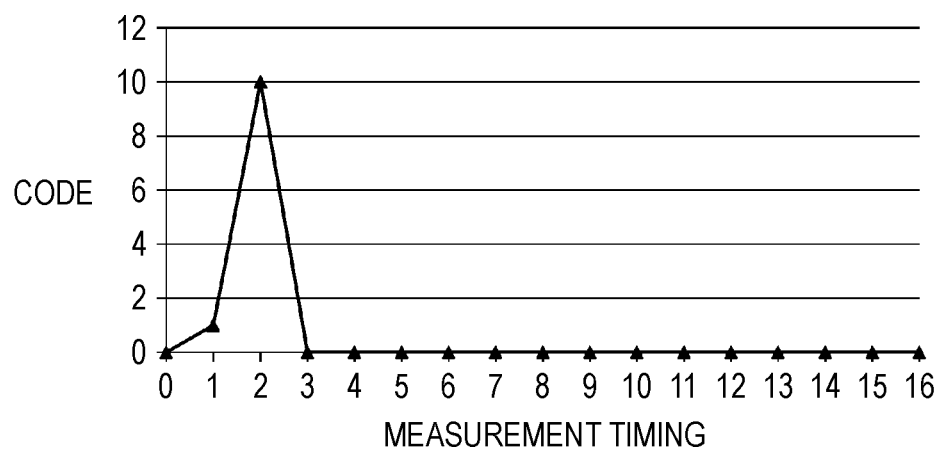
FIG. 10 is a graph illustrating a ratio code string of Reference 2 when codes are arrayed on the vertical axis.

FIGS. 6, 7, and 8 respectively illustrate graphs of the ratio code string of model A, model B, and Reference 1, when the codes are arrayed on the vertical axis. As illustrated in FIGS. 6 to 8, two or more peaks (maximum) caused by relatively large codes appear in all graphs of model A, model B, and Reference 1. For example, if the graph (FIG. 6) of the ratio code string of model A is noticed, a change from the first peak (code "2") to a valley between the two peaks (code "1") reflects that there is a flow rate change corresponding to the slow ignition (refer to FIG. 2). In addition, a portion with which the code 0 is continuous after the second peak (code "2") in the graph indicates that the flow rate is stabilized after the flow rate is increased again. Table 5 below illustrates differences between the ratios and codes obtained from the flow rate values of model C and Reference 2 described above. FIGS. 9 and 10 respectively illustrate graphs of the ratio code string of model C and Reference 2, when the codes are arrayed on the vertical axis.

TABLE 5

| Measurement Timing | Model C Difference between Ratios | Code | Reference 2 Difference between Ratios | Code |
| --- | --- | --- | --- | --- |
| 0 | 0 | 0 | 0 | 0 |
| 1 | 1.03 | 10 | 0.08 | 1 |
| 2 | −0.02 | 0 | 0.98 | 10 |
| 3 | −0.02 | 0 | −0.06 | 0 |
| 4 | 0.00 | 0 | 0.00 | 0 |
| 5 | 0.00 | 0 | 0.00 | 0 |
| 6 | 0.00 | 0 | 0.00 | 0 |
| 7 | 0.00 | 0 | 0.00 | 0 |
| 8 | 0.00 | 0 | 0.00 | 0 |
| 9 | 0.00 | 0 | 0.00 | 0 |
| 10 | 0.00 | 0 | 0.00 | 0 |

TABLE 5-continued

| | Model C | | Reference 2 | |
|---|---|---|---|---|
| Measurement Timing | Difference between Ratios | Code | Difference between Ratios | Code |
| 11 | 0.00 | 0 | 0.00 | 0 |
| 12 | 0.00 | 0 | −0.01 | 0 |
| 13 | 0.00 | 0 | 0.00 | 0 |
| 14 | 0.00 | 0 | 0.00 | 0 |
| 15 | 0.00 | 0 | 0.00 | 0 |
| 16 | 0.00 | 0 | 0.00 | 0 |

As illustrated in FIGS. 9 and 10, unlike the graphs of model A, model B, and Reference 1, only one peak caused by a relatively large code appears in the graphs of model C and Reference 2. Based on the comparison of FIGS. 6 to 8 and FIGS. 9 and 10, it is possible to determine that model A, model B, and Reference 1, and model C and Reference 2 are different gas appliances. In this way, the ratio code string simulates the flow rate change in the predetermined period. Therefore, appliance discrimination unit 114 can discriminate the currently using gas appliance by comparing the ratio code string generated by ratio encoding unit 112 and the ratio code string serving as the appliance inherent characteristic quantity held by appliance inherent characteristic information holding unit 119 with each other. Since the ratio code string is used, an advantageous effect can be expected in that the memory is saved and calculating speed is improved compared to a case where the ratio value is used as it is. As can be understood from the comparison of FIGS. 6 to 8 and FIGS. 9 and 10, the maximum and/or the minimum in the graph of the ratio code string reflects particularly well the characteristic of the flow rate change in the predetermined period. Therefore, the gas appliance may be discriminated by generating a compressed code string, based on the maximum and/or the minimum in the graph of the ratio code string.

For example, ratio encoding unit 112 generates the compressed code string by extracting the maximum value and/or the minimum value in the ratio code string as the appliance characteristic quantity. In a case where model A starts to be used, compressed code string "02120" is generated from ratio code string "02221122100000000". In a case where model B starts to be used, compressed code string "02020" is generated from ratio code string "02100122222100000". In a case where model C starts to be used, compressed code string "0A0" is generated. "A" in the compressed code string means code "10". For example, if numbers of "0" to "9" and alphabets of "A" to "F" are used for the code, the code string can be treated as a hexadecimal number. The compressed code string may be generated by appliance characteristic extraction unit 116.

In a case of using the compressed code string, appliance inherent characteristic information holding unit 119 pre-stores the compressed code string to be compared, as the appliance inherent characteristic quantity. For example, appliance inherent characteristic information holding unit 119 pre-holds compressed code string "0212120" corresponding to Reference 1 described above and compressed code string "0A0" corresponding to Reference 2.

Appliance discrimination unit 114 discriminates the gas appliance which starts to be used, by comparing the generated compressed code string and the compressed code string held by appliance inherent characteristic information holding unit 119 with each other. For example, when compressed code string generated by ratio encoding unit 112 is "0A0", the code string coincides with compressed code string "0A0" which is held by appliance inherent characteristic information holding unit 119 and which corresponds to Reference 2. Therefore, in this case, appliance discrimination unit 114 determines that the gas appliance which starts to be used is the gas appliance which is the same type as that of Reference 2.

In this way, the gas appliance can be discriminated, for example, by using the pattern of the ratio change, the ratio code string, or the compressed code string as the appliance characteristic quantity. As the appliance characteristic quantity, one of these may be used alone or a plurality of combinations may be used.

As the appliance characteristic quantity, the characteristic flow rate may further be used. That is, the discrimination using the pattern of the ratio change, the ratio code string, or the compressed code string may be combined with the discrimination using the characteristic flow rate. In this case, the characteristic flow rate of the gas appliance to be discriminated is pre-held as one of the appliance inherent characteristic quantities in appliance inherent characteristic information holding unit 119. For example, appliance discrimination unit 114 discriminates the currently using gas appliance by comparing the characteristic flow rate of the currently using gas appliance and the characteristic flow rate pre-held by appliance inherent characteristic information holding unit 119 with each other in addition to the comparison between the patterns of the ratio changes. In this manner, the gas appliance can be more accurately discriminated.

For example, a stable flow rate and an intermediate stable flow rate can be used for the characteristic flow rate serving as the appliance characteristic quantity. In a case where the intermediate stable flow rate is used as the characteristic flow rate serving as the appliance characteristic quantity, when the flow rate measured by flow rate measurement unit 104 falls within a predetermined range (for example, a range from a first predetermined flow rate to a second predetermined rate), an average of the flow rate values falling within the predetermined range may be used as the intermediate stable flow rate. Since the average of the flow rate values falling within the predetermined range is used, the intermediate stable flow rate can be distinguished from the stable flow rate, and the intermediate stable flow rate can be extracted as the characteristic flow rate. In the pattern of the flow rate change, the average of the flow rates of the flat portion appearing during a period until the flow rate is stabilized can be considered as the intermediate stable flow rate. However, in the pattern of the actually obtained flow rate change, it is difficult to identify the flat portion. In this case, the intermediate flow rate instead of the intermediate stable flow rate is extracted as the average of the flow rate values falling within the predetermined range. The intermediate flow rate may be used as the characteristic flow rate in order to discriminate the gas appliance.

Alternatively, in a case where the flow rate measured by flow rate measurement unit 104 falls within the predetermined range consecutively the predetermined number of times, the average of the flow rates corresponding to the predetermined number of times may be used as the characteristic flow rate. Instead of the measurement value of the flow rate, in a case where the above-described ratio falls within the predetermined range consecutively the predetermined number of times, the average of the ratios corresponding to the predetermined number of times may be used as the appliance characteristic quantity or the characteristic flow rate in order to discriminate the gas appliance.

As the appliance characteristic quantity and the appliance inherent characteristic quantity, in addition to the various quantities described above, it is possible to use mutually different quantities between the gas appliances to be discriminated. Therefore, for example, in a case where the gas fan heater, the gas stove, and the water heater are discriminated, one or more appliance inherent characteristic quantities used for the discrimination may be different from each other among the gas fan heater, the gas stove, and the water heater.

(Hardware Configuration)

Figure 11:
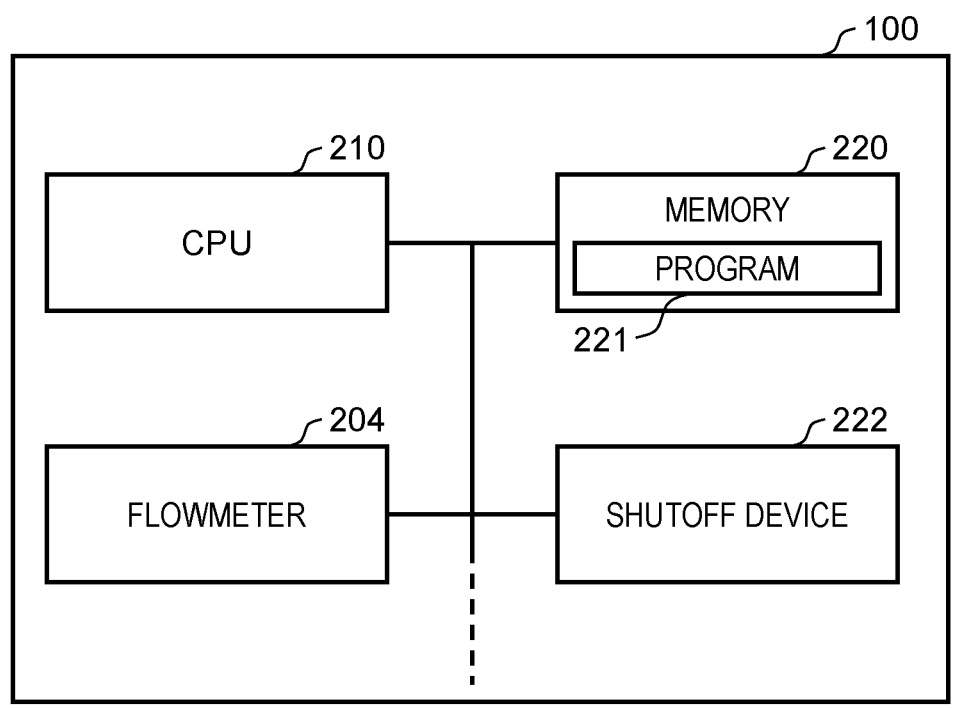
FIG. 11 is a block diagram illustrating an example of a hardware configuration of a gas meter according to the exemplary embodiment of the present invention.

FIG. 11 illustrates an example of a hardware configuration of gas meter 100. In the configuration illustrated in FIG. 11, gas meter 100 has central processing unit (CPU) 210, memory 220, flowmeter 204, and shutoff device 222. Flowmeter 204 is an example of flow rate measurement unit 104 illustrated in FIG. 1, and may be a known flowmeter, for example, an ultrasonic flowmeter. Shutoff device 222 is an example of shutoff unit 122 illustrated in FIG. 1, and may employ a known shutoff device, for example, a shutoff valve.

CPU 210 executes computer program 221 stored in memory 220. Various processes described above are recorded in computer program 221. For example, CPU 210 performs various processes of arithmetic unit 108, ratio encoding unit 112, appliance characteristic extraction unit 116, and appliance discrimination unit 114 illustrated in FIG. 1. Memory 220 typically includes a RAM and a ROM. For example, memory 220 corresponds to measured flow rate information storage unit 106, flow rate classification table holding unit 110, and appliance inherent characteristic information holding unit 119 illustrated in FIG. 1. Memory 220 can store a reference value for determining whether to shut off the gas.

Each of arithmetic unit 108, ratio encoding unit 112, appliance characteristic extraction unit 116, and appliance discrimination unit 114 may be a portion of a single processor (CPU 210). Control unit 105 may be realized in a combination of a plurality of processors. Control unit 105 may include one or more memories and a peripheral circuit. One or more memories may be located outside control unit 105. For example, at least one of measured flow rate information storage unit 106, flow rate classification table holding unit 110, and appliance inherent characteristic information holding unit 119 may be located outside control unit 105. Since various processes described above are performed using CPU 210 and memory 220, the gas appliance can be discriminated without depending on the quantity of the overall gas flow rates in the predetermined period.

A subsequent process after the gas appliance is discriminated is optionally determined. For example, depending on the discriminating result, the reference value for determining whether to shut off the gas can be changed to a proper level.

Hitherto, the exemplary embodiment according to the present invention has been described. The above description of the exemplary embodiment is merely an example of the present invention, and the exemplary embodiment is not intended to limit the present invention. In addition, it is also possible to adopt an exemplary embodiment in which the respective configuration elements described in the above-described exemplary embodiment are appropriately combined with each other. The present invention can be modified, substituted, added, or omitted within the scope of claims or their equivalent.

As described above, the flow rate measurement device according to the present invention includes the flow rate measurement unit that measures the flow rate of the gas flowing through the flow path at the prescribed time interval, and the arithmetic unit that calculates the characteristic flow rate from the flow rates measured within the predetermined period by the flow rate measurement unit, and calculates the ratio of each flow rate measured at multiple times within the predetermined period by the flow rate measurement unit with respect to the characteristic flow rate. In addition, the flow rate measurement device includes the appliance characteristic extraction unit that extracts the appliance characteristic quantity which indicates the characteristic of the flow rate change in the currently using gas appliance within the predetermined period, in which the appliance characteristic quantity is the ratio or information obtained from the ratio, and the appliance inherent characteristic information holding unit that holds one or more appliance inherent characteristic quantities indicating the characteristic flow rate state of a specific gas appliance. Furthermore, the flow rate measurement device includes the appliance discrimination unit that discriminates the currently using gas appliance by comparing the appliance characteristic quantity extracted by the appliance characteristic extraction unit with the appliance inherent characteristic quantity corresponding to the appliance characteristic quantity out of the one or more appliance inherent characteristic quantities held by the appliance inherent characteristic information holding unit.

In addition, the flow rate measurement device according to the present invention may further include the ratio encoding unit that generates the ratio code string by encoding the ratio. The appliance characteristic extraction unit extracts the ratio code string as the appliance characteristic quantity, and the appliance inherent characteristic information holding unit holds the ratio code string of the specific gas appliance as one of the one or more appliance inherent characteristic quantities. Furthermore, the appliance discrimination unit discriminates the currently using gas appliance by comparing the ratio code string generated by the ratio encoding unit with the ratio code string of the specific gas appliance held by the appliance inherent characteristic information holding unit.

In addition, in the flow rate measurement device according to the present invention, the ratio encoding unit may be configured to generate the compressed code string as the appliance characteristic quantity, based on the maximum and/or the minimum in the ratio code string.

In addition, in the flow rate measurement device according to the present invention, the appliance inherent characteristic information holding unit may be configured to hold the compressed code string generated from the ratio code string of the specific gas appliance, as one of the one or more appliance inherent characteristic quantities. Then, the appliance discrimination unit discriminates the currently using gas appliance by comparing the compressed code string of the currently using gas appliance and the compressed code string of the specific gas appliance with each other.

In addition, in the flow rate measurement device according to the present invention, the characteristic flow rate of the currently using gas appliance may be any one of the stable flow rate, the highest flow rate measured within the predetermined period, and the flow rate obtained at the latest time out of the flow rates measured within the predetermined period.

In addition, in the flow rate measurement device according to the present invention, in a case where the flow rate measured by the flow rate measurement unit falls within the predetermined range, the appliance characteristic extraction unit may be configured to extract the average of the flow rates falling within the predetermined range, as the characteristic flow rate of the currently using gas appliance.

In addition, in the flow rate measurement device according to the present invention, in a case where the flow rate measured by the flow rate measurement unit falls within the predetermined range consecutively the predetermined number of times, the appliance characteristic extraction unit may be configured to extract the average of the flow rates corresponding to the predetermined number of times, as the characteristic flow rate of the currently using gas appliance.

In addition, in the flow rate measurement device according to the present invention, the appliance inherent characteristic information holding unit may pre-holds the characteristic flow rate in the specific gas appliance, as one of the one or more appliance inherent characteristic quantities. Then, the appliance discrimination unit discriminates the currently using gas appliance by further comparing the characteristic flow rate of the currently using gas appliance and the characteristic flow rate in the specific gas appliance with each other.

In addition, as the specific gas appliance, the flow rate measurement device according to the present invention may include at least the gas fan heater and the water heater, and the one or more appliance inherent characteristic quantities in the gas fan heater and the one or more appliance inherent characteristic quantities in the water heater may be different from each other.

INDUSTRIAL APPLICABILITY

According to the exemplary embodiment of the present invention, the flow rate measurement device can discriminate the gas appliance, even in a case where the flow rate measurement device is connected to the new gas appliance in which the high gas flow rate unexpected so far is required when an operation starts. Therefore, the exemplary embodiment according to the present invention is usefully applicable to the gas meter, for example.

REFERENCE MARKS IN THE DRAWINGS 13 to 15 GAS APPLIANCE
100 GAS METER
102 FLOW PATH
104 FLOW RATE MEASUREMENT UNIT
105 CONTROL UNIT
106 MEASURED FLOW RATE INFORMATION STORAGE UNIT
108 ARITHMETIC UNIT
110 FLOW RATE CLASSIFICATION TABLE HOLDING UNIT
112 RATIO ENCODING UNIT
114 APPLIANCE DISCRIMINATION UNIT
116 APPLIANCE CHARACTERISTIC EXTRACTION UNIT
119 APPLIANCE INHERENT CHARACTERISTIC INFORMATION HOLDING UNIT
122 SHUTOFF UNIT

The invention claimed is:

1. A flow rate measurement device comprising:
a flow rate measurement unit that measures a flow rate of gas flowing through a flow path at a prescribed time interval;
an arithmetic unit that calculates a characteristic flow rate from the flow rates measured within a predetermined period by the flow rate measurement unit, and calculates a ratio of each flow rate measured at multiple times within the predetermined period by the flow rate measurement unit with respect to the characteristic flow rate;
an appliance characteristic extraction unit that extracts an appliance characteristic quantity which indicates a characteristic of a flow rate change in a currently using gas appliance within the predetermined period, the appliance characteristic quantity being the ratio or information obtained from the ratio;
an appliance inherent characteristic information holding unit that holds one or more appliance inherent characteristic quantities indicating a characteristic flow rate state of a specific gas appliance;
an appliance discrimination unit that discriminates the currently using gas appliance by comparing the appliance characteristic quantity extracted by the appliance characteristic extraction unit with an appliance inherent characteristic quantity corresponding to the appliance characteristic quantity out of the one or more appliance inherent characteristic quantities held by the appliance inherent characteristic information holding unit; and
the gas appliance discriminated by the appliance discrimination unit is a gas appliance having a flat portion until the flow rate is stabilized in a flow rate change pattern obtained at a certain time interval from a start of use, and
the characteristic flow rate is an average value of the flow rates of the flat portion.

2. The flow rate measurement device of claim 1, further comprising:
a ratio encoding unit that generates a ratio code string by encoding the ratio,
wherein the appliance characteristic extraction unit extracts the ratio code string as the appliance characteristic quantity,
wherein the appliance inherent characteristic information holding unit holds a ratio code string of the specific gas appliance as one of the one or more appliance inherent characteristic quantities, and
wherein the appliance discrimination unit discriminates the currently using gas appliance by comparing the ratio code string generated by the ratio encoding unit with the ratio code string of the specific gas appliance which is held by the appliance inherent characteristic information holding unit.

3. The flow rate measurement device of claim 2,
wherein the ratio encoding unit generates a compressed code string as the appliance characteristic quantity, based on a maximum and/or a minimum in the ratio code string.

4. The flow rate measurement device of claim 3,
wherein the appliance inherent characteristic information holding unit holds the compressed code string generated from the ratio code string of the specific gas appliance, as one of the one or more appliance inherent characteristic quantities, and
wherein the appliance discrimination unit discriminates the currently using gas appliance by comparing the compressed code string of the currently using gas appliance with the compressed code string of the specific gas appliance.

* * * * *